(12) United States Patent
Cobb et al.

(10) Patent No.: US 7,797,580 B2
(45) Date of Patent: *Sep. 14, 2010

(54) DETERMINING THAT A ROUTINE HAS STALLED

(75) Inventors: Jeffrey R. Cobb, San Carlos, CA (US); Lewis K. Cirne, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 1140 days.

This patent is subject to a terminal disclaimer.

(21) Appl. No.: 11/167,333

(22) Filed: Jun. 27, 2005

(65) Prior Publication Data

US 2005/0240908 A1    Oct. 27, 2005

Related U.S. Application Data

(63) Continuation of application No. 10/079,966, filed on Feb. 21, 2002, now Pat. No. 7,225,361.

(60) Provisional application No. 60/272,147, filed on Feb. 28, 2001.

(51) Int. Cl.
G06F 11/00 (2006.01)

(52) U.S. Cl. .......................................... 714/38; 714/51

(58) Field of Classification Search .................. 714/38, 714/51
See application file for complete search history.

(56) References Cited

U.S. PATENT DOCUMENTS

| 5,655,081 | A |  | 8/1997  | Bonnell et al. |
| 5,898,873 | A |  | 4/1999  | Lehr |
| 5,978,594 | A |  | 11/1999 | Bonnell et al. |
| 6,332,212 | B1 |  | 12/2001 | Organ et al. |
| 6,457,142 | B1 | * | 9/2002  | Klemm et al. ................. 714/38 |
| 7,225,361 | B2 | * | 5/2007  | Cobb et al. ................... 714/38 |

* cited by examiner

*Primary Examiner*—Bryce P Bonzo
(74) *Attorney, Agent, or Firm*—Vierra Magen Marcus & DeNiro LLP

(57) ABSTRACT

A system is disclosed that can determine whether a routine is stalled. The system does not require the developer of the routine to add code for the purpose of detecting whether the routine is stalled. Furthermore, the system can be used to monitor various routines at different levels of granularity, such as at the thread level, method level, or other levels. One embodiment of the present invention allows a user to specify a method and an expected time frame. Code for that method is modified to add additional code that implements a timing mechanism. The timing mechanism is used to detect when a thread enters that method and does not return within an approximation of the expected time frame. Other embodiments are also within the scope of the present invention.

23 Claims, 5 Drawing Sheets

Figure 1
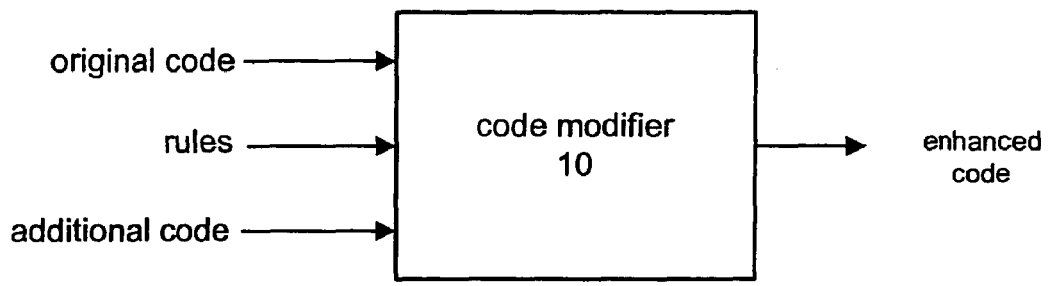
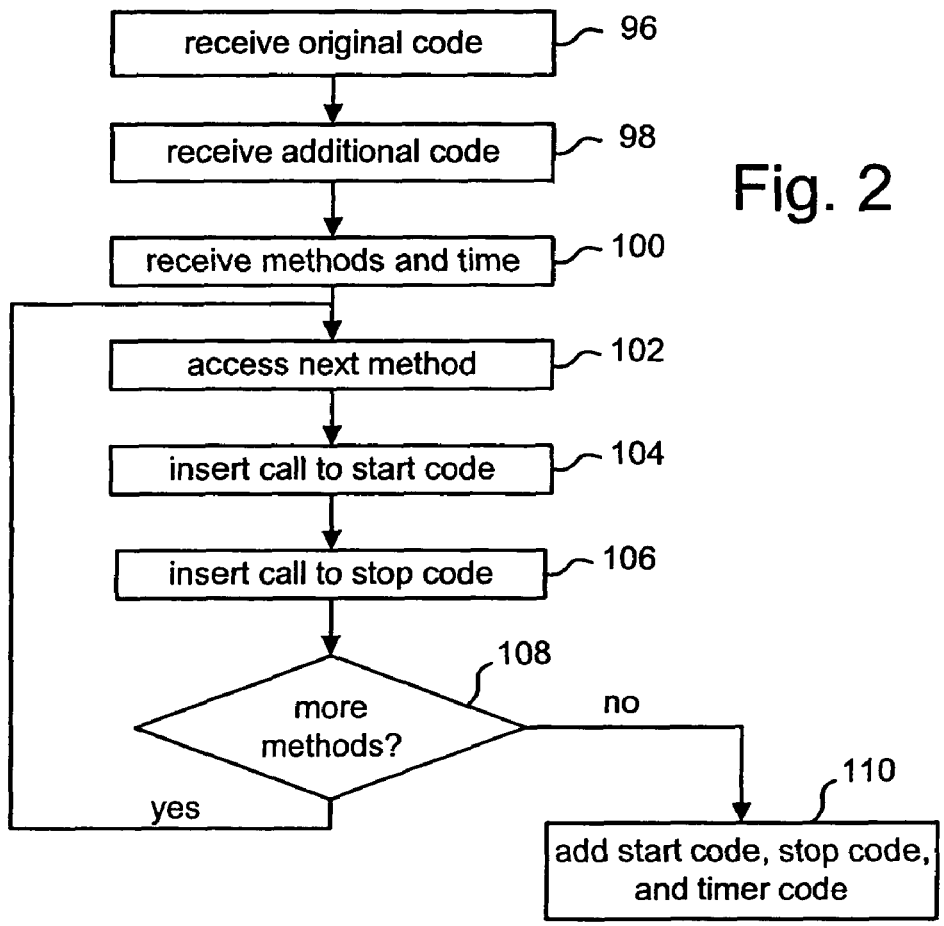
Fig. 2

DETERMINING THAT A ROUTINE HAS STALLED

This application is a continuation application of U.S. patent application Ser. No. 10/079,966, entitled, "Detecting a Stalled Routine," filed on Feb. 21, 2002, now U.S. Pat. No. 7,225,361, incorporated herein by reference, and claims the benefit of U.S. Provisional Application No. 60/272,147, titled "Detecting a Lost Routine," filed Feb. 28, 2001, incorporated herein by reference.

BACKGROUND OF THE INVENTION

1. Field of the Invention

The present invention is directed to technology for detecting a stalled routine.

2. Description of the Related Art

As the Internet's popularity grows, more businesses are establishing a presence on the Internet. These businesses typically set up web sites that run one or more web applications. One disadvantage of doing business on the Internet is that if the web site goes down, becomes unresponsive or otherwise is not properly serving customers, the business is losing potential sales and/or customers. Thus, there is a need to monitor live web applications and web sites to make sure that they are running properly.

One particular scenario that web application developers seek to avoid is a routine that stalls. A routine typically is started, performs a task and ends. A stalled routine will start its task and either never complete its task or run so slowly that the system is better off canceling the routine. For example, it may be expected that a routine will take a fraction of one second to complete its task; however, due to something going wrong, the routine is still running after 7 seconds. In this case, the routine is considered stalled. It is still possible that the routine may finish. It is also possible that the routine will never finish. Typically, a stalled routine is a bounded operation that has continued to be active significantly past a reasonable time of completion, where the definition of reasonable is operation dependent.

A stalled routine can degrade performance of a web site, degrade performance of a web application, and cause an application to fail or cause a web site to fail. Thus, there is a need to detect when a routine has stalled.

Some prior attempts to determine whether a routine has stalled have involved the software developer including source code in the routine that informs another entity that the routine is still functioning in a normal manner. This system, however, requires the source code to be manually edited to insert the additional code. In some cases, the source code is not available and, therefore, the technique cannot be used. Additionally, the software developer is responsible for adding the code and many software engineers do not want to add extra code that is unnecessary to the intended functions of the software.

Another prior attempt to determine whether a routine has stalled involves determining whether a program is responding to user inputs. Such functionality is common on many personal computer operating systems. While these systems can determine whether an entire application is stalled, they are unable to determine whether a routine within the application is stalled, if the application is still responding to user inputs.

Thus, there is a need to detect when a routine has stalled that overcomes the limitations of the prior art.

SUMMARY OF THE INVENTION

The present invention, roughly described, includes a system that can determine that a routine is stalled. The system does not require the developer of the routine to manually add code for the purpose of detecting whether the routine is stalled. Furthermore, the system can be used to monitor various routines at different levels of granularity, such as at the thread level, method level, or other levels.

One embodiment of the present invention includes accessing existing code for a first routine, automatically modifying the existing code to include new code, and using the new code to determine if the first routine has stalled. One exemplar implementation allows a user to specify a method and an expected time frame. Code for that method is modified to add additional code that implements a timing mechanism. The timing mechanism is used to detect when a thread enters that method and does not return within an approximation of the expected time frame.

Another embodiment of the present invention includes receiving an indication that a particular routine is running, where the particular routine is one of a plurality of routines that comprise a process, and automatically determining whether the particular routine has stalled.

An exemplar implementation includes receiving an indication that a first routine has started, starting a timing mechanism in response to that indication, and receiving an indication that the first routine has completed, if the first routine does actually complete. The timing mechanism is stopped in response to receiving the indication that the first routine has completed. The system reports that the first routine is stalled if the timing mechanism is not stopped prior to a determination that the timing mechanism is overdue.

One exemplar use of the present invention is on web server and/or application server used to implement a web site for an organization doing business on the Internet.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 1 is a block diagram of the code modifier of the present invention.

FIG. 2 is a flow chart explaining the operation of the code modifier.

DETAILED DESCRIPTION

Figure 3:
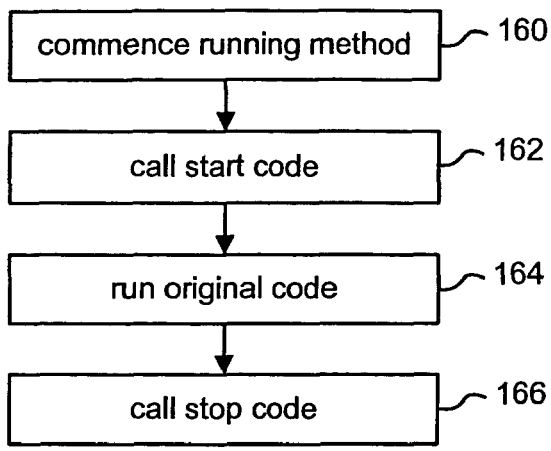
FIG. 3 is a flow chart describing one embodiment of the operation of the present invention.

The present invention includes a system that can determine that a routine is stalled. The system can be used to monitor various routines at various levels of granularity, such as at the thread level, method level, or other levels. For purposes of this patent document, a routine is a generic term that refers to any sequence of operations. Thus, a routine can be a method, thread, process, any combination of the above, or any subset of the above, depending on its usage. For example, when stating that a particular routine is one of a plurality of routines that comprise a process, that usage indicates that the word routine is not meant to cover a process and is meant to cover threads, methods or other suitable flows of control within a process. A discussion of a process, thread and method follow.

A process is the context (i.e. namespace) for resource allocations (threads, memory, open files, network connections, etc.) in which an operating system places a running program. In general, entities within a process can relatively cheaply share access to the resources of the process and entities in different processes cannot share resources without heavy-weight, expensive services. For example, it is easy for two threads in the same process to access the same memory.

A thread is a single sequential flow of control within a process, which shares as much of the program environment so that minimal state needs to be saved and restored when changing threads. At any given time during the runtime of a thread, there is a single point of execution. A thread itself is not a full process; it cannot run on its own. Rather, it runs within a process. It is contemplated that a given process may have many threads running at the same time. For example, many threads may comprise a process.

A method is a unit of code that is a subset of a program or process, and that can be invoked to perform one or more specific tasks when that program or process is run. A process can include executing many methods at the same time or at different times. A thread can execute one or more methods in a sequential manner. While multiple threads for a given process can run at the same time, each thread can only execute one method at any given point in time.

For example, consider an application program that implements a browser. When the application is started, a browser process is run on the computer. The browser allows a user to scroll a page while downloading an applet or image. The ability to scroll is performed by a first thread and the ability to download is performed by another thread. The thread that downloads may first perform a method for making a connection, followed by a method for communicating and a method for opening a new file to store the downloaded contents.

One embodiment of the present invention allows a user to specify a method and then detects when a thread enters that method and does not return within an approximation of an expected time frame. Other embodiments of the present invention monitor threads without regard to particular methods, monitor methods without regard to threads, monitors any thread or a specific thread running a specific method, monitor code routines (methods, threads, others, etc.) below the process level, monitor other types of routines, etc.

One implementation of the present invention operates on Java code. For example purposes, the remaining portions of this document provide examples using Java code. However, the present invention applies to other programming languages and formats as well. The examples below make use of the term "method" in reference to the Java code. For purposes of this document, "method" includes a Java method as well as other sets of instructions such as procedures, functions, routines, subroutines, sequences, etc. in any programming language, format, definition, etc.

FIG. 1 shows a block diagram of the code modifier 10 of the present invention. Code modifier 10 includes three inputs. The first input includes the existing original code that is to be monitored. The second input to code modifier 10 includes a set of one or more rules. The rules are in a user created file and instruct code modifier on how to modify the existing original code. U.S. Pat. No. 6,260,187, Jul. 10, 2001, Lewis K. Cirne, incorporated herein by reference in its entirety, describes exemplar rules and a system for modifying code that can be used to implement the present invention. One rule that can be used with code modifier 10 is the stalled routine rule, which instructs code modifier 10 to modify the existing original code in order to monitor whether a particular routine has stalled. In one embodiment, the rule identifies a method in a class and a threshold time. The rule could also specify the type of reporting requested. In other embodiments, there can be a generic rule for all profiling and, therefore, the rule would need to specify which type of profiling is requested (e.g. the stalled method tracer).

The third input to code modifier 10 includes additional code (e.g. additional classes). The inputs to code modifier 10 are one or more files. Alternatively, the inputs can be entered using a user interface or some other input/output mechanism (e.g. a network connection). The output of code modifier 10 includes the enhanced code (e.g. the original classes after modifications) and the appropriate additional classes used according to the rules, all merged together in one or more output streams (files, network, etc.). By merged together, it is meant that they are written to the same file (including zip, jar, etc.), to the same directory, or to the same storage element.

Code modifier can be used to modify any type of code. In one embodiment, code modifier is used to modify object code. Object code can be generated by a compiler or an assembler. Alternatively, object code can be generated manually. Object code can be machine executable or suitable for processing to produce executable machine code. Modifying object code includes adding new instructions to the object code and/or modifying existing instructions in the object code. Modifying object code does not involve accessing the source code. An example of modifying object code can be found in U.S. Pat. No. 6,260,187, incorporated herein by reference.

The examples below describe the modifying and monitoring of a method. However, the present invention can also be performed on other types of routines in addition to methods.

In one embodiment of the present invention, new functionality is added to a method such that all or part of the new functionality is executed upon exit from the method. Rather than add many copies of the exit code in different places, the present invention adds exit code using "try" and "finally" functionality. Consider the following example pseudo code for a method called "foo" that includes a set of Java instructions:

```
public foo( )
{
    [Java instructions]
}
```

For example purposes, assume that a user wishes to monitor the method foo( ) to determine whether it becomes stalled. To do this, in one embodiment, code is inserted into the method to start a timing mechanism and code is inserted into the method to stop the timing mechanism. One embodiment conceptually adds code to the above method foo( ) as follows:

```
public foo( )
    StalledMethodTracer StalledMethodTracer1=
    MethodTracerFactory.newStalledMethodTracer(parameters)
    {
        if (StalledMethodTracer1!=null)
        {
            StalledMethodTracer1.startTrace( );
        }
        try {
            [Java instructions]
        } finally
        {
            if (StalledMethodTracer1 !=null)
            {
                StalledMethodTracer1.finishTrace( );
            }
        }
    }
```

As can be seen, the new instruction StalledMethodTracer1.startTrace( ) has been added to start the monitoring function. In one embodiment, the instruction StalledMethodTracer1.startTrace( ) calls a Java method startTrace which is part of the StalledMethodTracer class and is used to start the timing mechanism, as described below. Additionally new code StalledMethodTracer1.finishTrace( ) has been added that stops the monitoring function. In one embodiment, the instruction StalledMethodTracer1.finishTrace( ) calls a Java method finishTrace which is part of the StalledMethodTracer class and is used to stop the timing mechanism, as described below. Rather than physically insert copies of the instruction StalledMethodTracer1.finishTrace( ) at every possible explicit exit, the present invention conceptually encloses the [Java instructions] within a "try" block and places the stop code within a "finally" block. This implementation provides that the stop code will be performed regardless of the exit from the "try" block, including intentional exits and exceptions.

There are many ways to implement the methods used to start and stop the timing mechanism of the present invention. In one embodiment, a generic interface is created that defines a generic tracer for profiling. A generic abstract class is created that implements the interface. The interface includes the methods startTrace and finishTrace. The generic abstract class includes the methods startTrace, finishTrace, dostartTrace and dofinishTrace. The method startTrace is called to start a tracer, perform error handling and perform setup for starting the tracer. The actual tracer is started by the method doStartTrace, which is called by startTrace. The method finishTrace is called to stop a tracer, and to perform error handling. The method finishTrace calls doFinishTrace to actually stop the tracer. Within the generic abstract class, startTrace and finishTrace are final and void methods, and doStartTrace and doFinishTrace are protected, abstract and void methods. Thus, the methods doStartTrace and doFinishTrace must be implemented in subclasses of the generic abstract class. Each of the subclasses of the generic abstract class implements the actual tracers. The class StalledMethodTracer is a subclass of the generic abstract class and provides its own version of the methods doStartTrace and doFinishTrace. The parameters of one embodiment of the class StalledMethodTracer includes data such as a threshold time, the name of the method (e.g. foo), the name of the class, and other data depending upon the implementation. More details of the methods doStartTrace and doFinishTrace are discussed below.

The above example shows source code being instrumented. In one embodiment, the present invention doesn't actually modify source code. Rather, the present invention modifies object code. The source code examples above are used for illustration to explain the concept of the present invention. The object code is modified to add the functionality of the "try" block and "finally" block. In other embodiments, source code can be modified to implement the present invention.

FIG. 2 depicts a flow chart that describes how the existing code is modified to add the functionality to monitor for a stalled routine. In step 96, code modifier 10 receives the existing original object code. In one embodiment, the received code is object code (also called byte code) and is stored in a class data structure according to the Java Virtual Machine Specification. The term code is used to refer to all of the instructions, variables, definitions, pointers, addresses etc, that are stored in a class file and/or a class data structure. In step 98, the system receives the additional code. The additional code will include the new classes that implement the timing mechanism and reporting functions described herein. For example, the additional code would include the StalledMethodTracer class described above.

In step 100, the system receives an identification of the methods to be monitored. In one embodiment, for each method (or other type of routine) a threshold time is identified. In one alternative, the threshold time is an approximation of a longest expected time frame for the method to complete its task. Alternatively, the threshold time can be a time for which an entity concludes that if the method is running for that threshold time then it must be stalled. For example, an entity may estimate that a method should finish its task in a tenth of a second under ideal conditions and in two seconds under worst case conditions,. then the rule may be created with a threshold of two seconds or a time frame a bit larger than two seconds (e.g. 3 seconds). The threshold time is dependent on the method (or other routine) being monitored. As described above, one embodiment of step 100 is receiving a rule. Other means for performing step 100 can be used.

In step 102, the system accesses one of the methods specified in step 100. In step 104, one or more instructions are added to the method to call the start code. In one embodiment, the start code is used to start the timing mechanism described herein. In one embodiment, the one or more instructions of step 104 are added at the beginning of the sequence of execution of the method. These one or more instructions are used to create the timing mechanism and to call another method which starts the timing mechanism; for example, adding the pseudo instructions StalledMethodTracer1=MethodTracerFactory.newStalledMethodTracer and stalledMethodTracer1.startTrace( ). In other embodiments, all (or less than all) of the instructions to start and/or implement the timing mechanism are added. Other embodiments may not need to add the code to create the timing mechanism. In step 106, one or more instructions are added to call the stop code. In one embodiment, the stop code is used to stop the timing mechanism described herein. In one embodiment, the one or more instructions of step 106 are added at some or all of the exits of the sequence of execution of the method and are used to call another method, which stops the timing mechanism. One example of step 106 includes adding the pseudo instruction StalledMethodTracer.finishTrace( ) and the try-finally functionality, as described above. In other embodiments, all (or less than all) of the instructions to stop and/or implement the timing mechanism are added.

In step 108, it is determined whether there are any more methods (or other types of routines) that were identified in step 100 and were not modified yet. If so, the method loops to step 102 and the next method is accessed. If all of the methods identified in step 100 have been modified, then, in step 110, the code to start, stop and otherwise implement the timing mechanism is added to the original code (as modified). For example, the code for the StalledMethodTracer class can be added to the code for the modified version of foo( ) from the above example.

Steps 102-110 are performed automatically. That is, they are performed by a machine. Many previous attempts to modify code are manual, that is, they require a human to manually modify the code.

More details of modifying the object code in accordance with the above discussion (including adding the start code, stop code, and try-finally functionality) can be found in U.S. patent application Ser. No. 09/795,901, "Adding Functionality To Existing Code At Exits," filed on Feb. 28, 2001, incorporated herein by reference. Other methods known in the art for modifying code can also be used, for example, those found in U.S. Pat. No. 5,193,180; U.S. Pat. No. 6,021,272; Automatic Program Transformation with JOIE, by Cohen, Chase, Kaminsky, USENIX Annual Technical Symposium, June 1998; BIT: A Tool for Instrumenting Java Bytecodes, by Lee and Zom, USITS 97, December 1997; Binary Component Adaption, by Keller and Holze, University of California, Technical Report, December 1997; and EEL: Machine-Independent Executable Editing, by Larus and Schnarr, SIGPLAN Conference on Programming Language Design and Implementation, June 1995.

FIG. 3 is a flow chart describing one embodiment of the operation of the present invention. In many embodiments, the present invention will be performed after the steps of FIG. 2 and during the operation of an application, process etc. The application, process etc. is likely to have many methods, some or all of which have been identified for monitoring. In step 160, a method which has been identified for monitoring starts to run. In one embodiment, that method is part of an instance of a class that includes the method. In step 162, a call to the start code is made. For example, the instruction StalledMethodTracer1.startTrace( ) is executed. In some embodiments, the start code is not a method. Rather it is another grouping of code, etc. In step 164, the original code for the method is executed; for example, the [Java instructions] for the method foo( ) can be executed. If the method does not stall, then, in step 166, a call to the stop code is made. For example, the instruction StalledMethodTracer1.finishTrace( ) is executed. In some embodiments, the stop code is not a method. Rather it is another grouping of code, etc. If the original code stalls, step 166 may never be executed.

Figure 4:
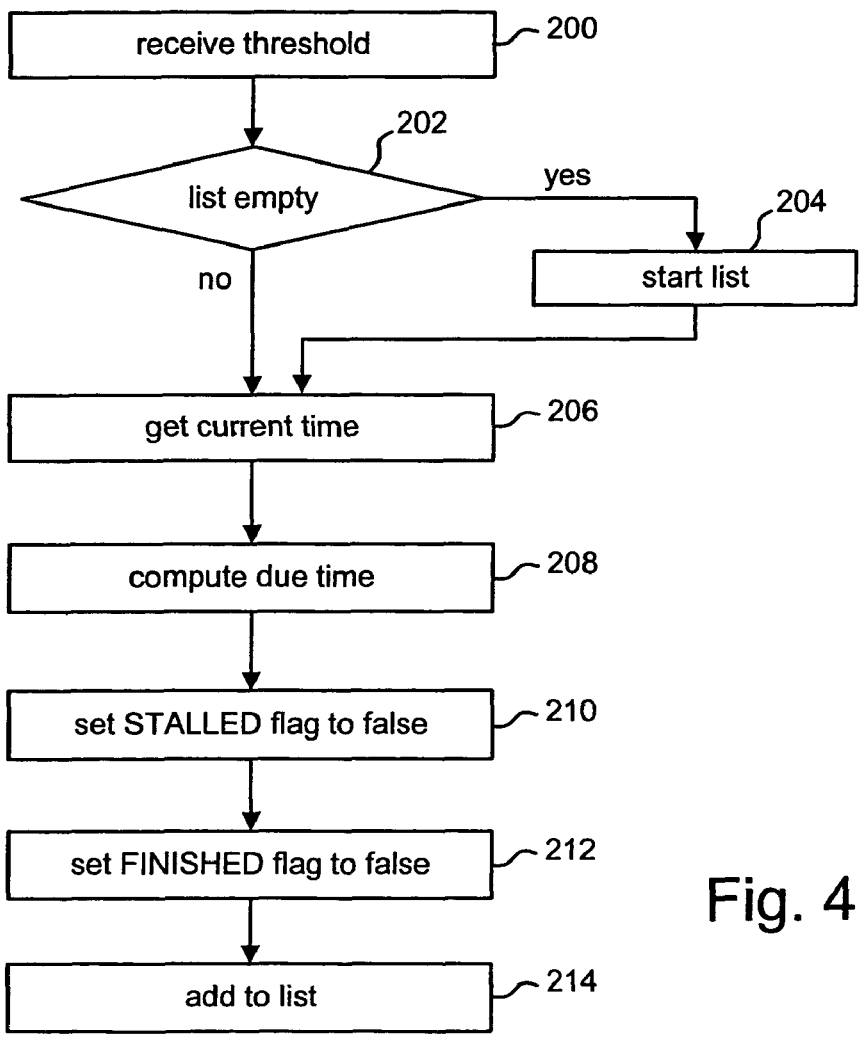
FIG. 4 is a flow chart describing one embodiment of start code.

FIG. 4 describes one embodiment of the operation of the start code, when called by step 162. The start code is used to start a timing mechanism. There are many timing mechanisms that can be used with the present invention. One example is a countdown timer that is provided with a threshold time and if the countdown timer finishes counting to zero from the threshold time prior to the method finishing, then the method being monitored is considered to be stalled. Another timing mechanism includes determining a due time and requesting the Operating System to contact/interrupt at the due time. Many other timing mechanisms can also be used.

In the embodiment described below, a generic system is set up that maintains a list of timing mechanisms. In one embodiment, the generic system maintains a list of due times and repeatedly checks the list to see if any of the due times are passed due. If a due time is passed due, then the method being monitored that is associated with the due time is considered as being stalled.

In step 200 of FIG. 4, the start code receives the threshold time. In one embodiment, the start code explicitly receives the identification of the method, which it is monitoring. In other embodiments, that information is available to be accessed by the start code. In step 202, the start code determines whether the list of due times is empty. In one implementation, if the list is empty, then the list is null or non-existent. If the list is empty, the list is started in step 204 (which in one embodiment includes creating the list). In step 206, the start code accesses the current time from the system. The current time can typically be acquired from the Operating System using a system call, library routine, etc. In step 208, the start code determines a due time. In one embodiment, the start code adds the threshold time (received in step 200) to the current time in order to determine the due time.

In one embodiment, the timing mechanism will maintain various data; for example, a flag indicating whether the method (or other routine) being monitored has been determined to be stalled (referred to as the STALLED flag) and a flag indicating whether the method (or other routine) being monitored has finished (referred to as the FINISHED flag). In one embodiment, these flags are maintained by the object that includes the start code and the stop code. In one embodiment, the start code and stop code are in a class that is instantiated to create an object for the particular method being traced. In step 210, the STALLED flag is set to false, which indicates that the method (or other routine) being monitored has not been determined to be stalled. In step 212, the FINISHED flag is set to false, which indicates that the method (or other routine) being monitored has not finished. In step 214, the information for the method (or other routine) being monitored that is currently under consideration is placed on the list. In one embodiment, the list includes due times, an indication of the method being monitored, and an indication of the object associated with monitoring that method. In one implementation, the object associated with monitoring the method is an instance of the StalledMethodTracer class.

Figure 5:
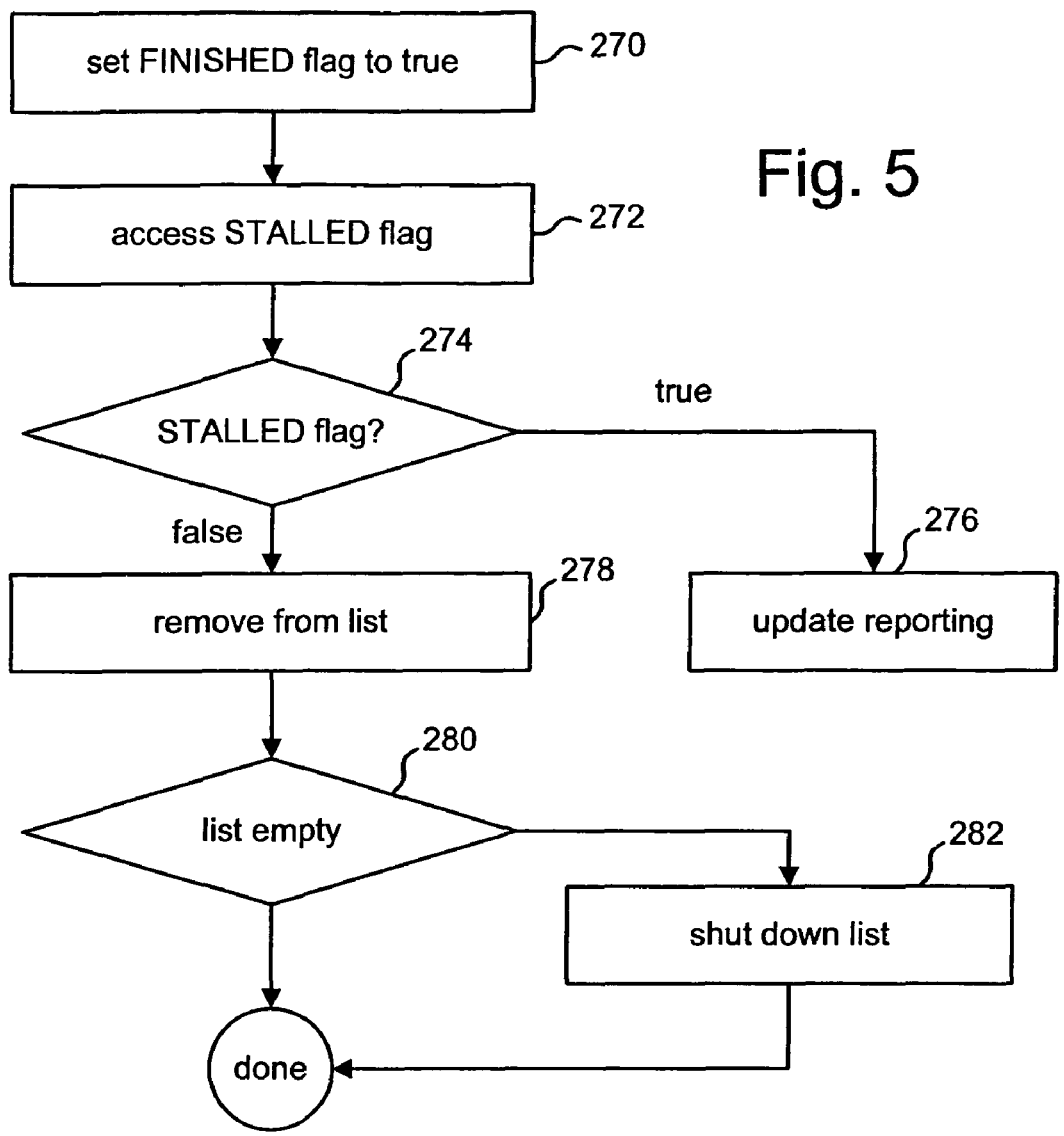
FIG. 5 is a flow chart describing one embodiment of stop code.

FIG. 5 describes one embodiment of the operation of the stop code. As described above, the sequence of operations performed in FIG. 5 are likely to be performed when or after the method (or other routine) exits, which is likely to mean that the method (or other routine) is not stalled. In step 270, the stop code sets the FINISHED flag to true, indicating that the method (or other routine) being monitored has finished. In step 272, the STALLED flag is accessed. If the STALLED flag is true, indicating that the method (or other routine) has been reported as being stalled (step 274), then the reporting mechanism is updated in step 276 to indicate that the method is no longer stalled. In one embodiment, the reporting mechanism includes a counter that indicates how many methods (or other routines) are currently stalled. Other reporting mechanisms can also be used. The reporting of stalled routines will be discussed in more details below.

If, in step 274, it is determined that the STALLED flag was not set to false, indicating that the method (or other routine) has been determined to be stalled, then the due time (and other associated data) for that method is removed from the list described above in step 278. If the list becomes empty due to removing the due time (step 280), then the list functionality is shut down in step 282 to save system resources. Note that the shutting down of the list is an optional feature that is not included in all embodiments.

Figure 6:
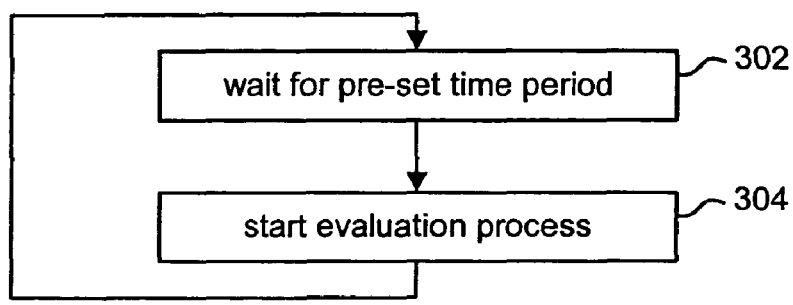
FIG. 6 is a flow chart describing one embodiment of a process performed by a timing mechanism.
Figure 7:
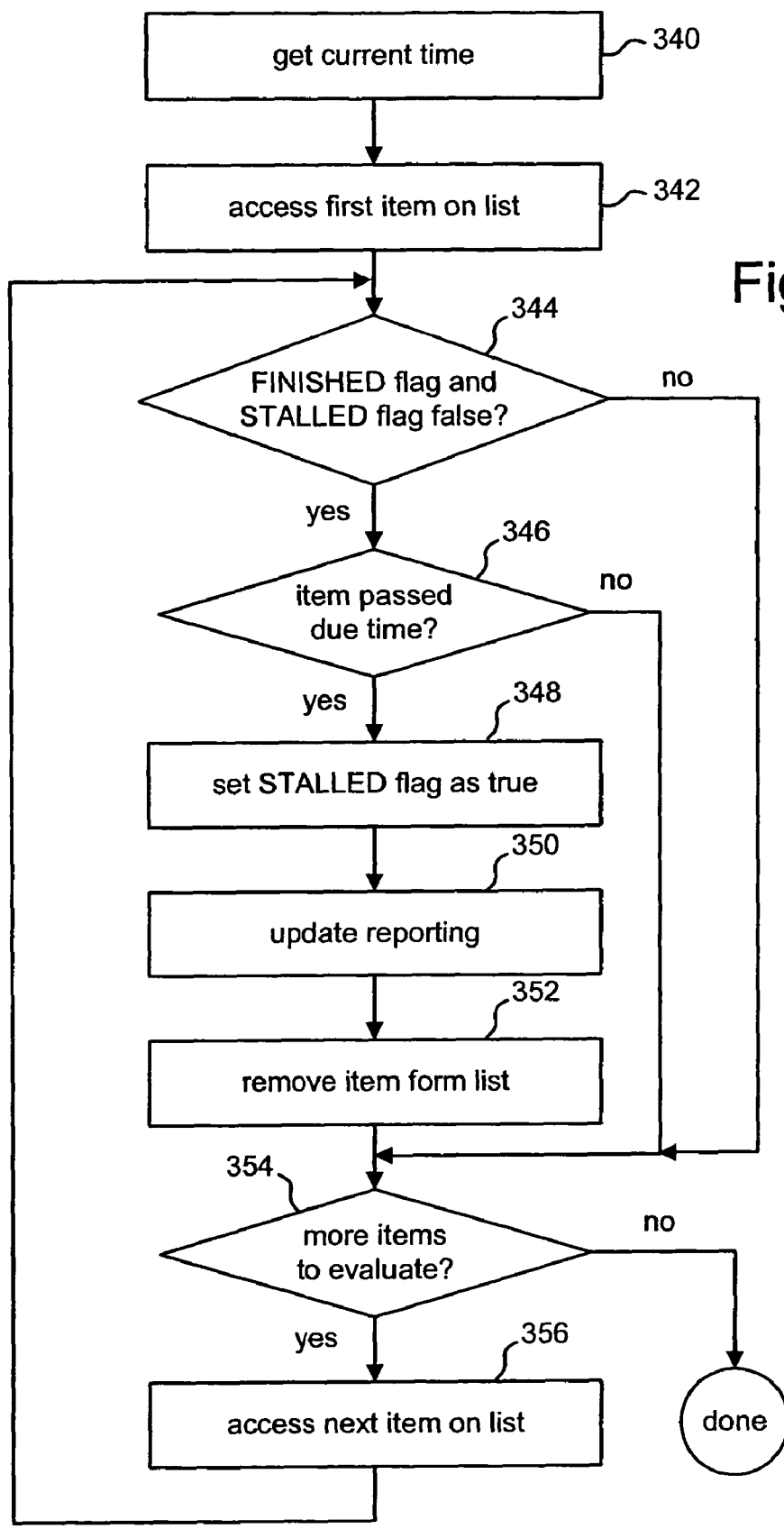
FIG. 7 is a flow chart describing one embodiment of an evaluation process for a timing mechanism.

FIGS. 6 and 7 describe the operation of using the list described above to automatically determine whether a method (or other routine) has stalled. A clock watching system waits for a pre-set time period (e.g. 7.5 seconds) in step 302 and then starts the evaluation process in step 304. After step 304, the system loops back to step 302 and again waits for the pre-set time period. In one embodiment, the system waits for the pre-set time period by continuously watching the system clock until the pre-set time period elapsed. In another embodiment, the systems requests that the operating system alert it at the end of the pre-set timer period. The process of FIG. 6 is automatic in the sense that is continue to operate in an automated fashion.

FIG. 7 describes the steps taken to perform one embodiment of the evaluation process started in step 304. In step 340, the current time is acquired. For example, the operating system can be queried regarding the system clock. In step 342, the first item on the list of due times is accessed. In step 344, it is determined whether the FINISHED flag and the STALLED flag are both set to false for the method associated with the due time on the list currently being accessed. If both flags are false, indicating that the method is not finished and is not stalled, then it is determined whether the current time is past the due time in step 346. If the current time is passed the due time, then the method is considered to be stalled and the STALLED flag is set to true in step 348. In step 350, the reporting mechanism is updated to reflect that the method is stalled. In one embodiment, the reporting mechanism may not exist until there is data to report and, if step 350 is the first time data is being reported, then the reporting mechanism may need to be started. In step 352, the due time and other associated data is removed from the list. In one embodiment, the due time and associated data is never removed form the list, is removed form the list after a much longer period of time (minutes, hours, days, etc.), can only manually be removed from the list. In one embodiment, even after the due time is removed form the list, the monitor object that includes the start code, stop code and state data remains. In step 354, it is determined whether there are more items on the list to evaluate. If there are no more items to evaluate, then the sequence of steps of FIG. 7 has completed. If there are more items to evaluate, then the next item on the list is accessed in step 356 and the sequence continues at step 344. If, in step 344, it was determined that either the FINISHED flag was not false or the STALLED flag was not false then it is assumed that either the method already finished (so it cannot be stalled) or it has already been determined to be stalled; therefore, the sequence of steps continues at step 354. If, in step 346, it was determined that the current time is before the due time, then the method is not determined to be stalled and the sequence of steps continues at step 354. As described, the system may not necessarily determine the exact time that a method stalls because it only checks at certain intervals against an approximation of a time that the method should have been finished.

There are many ways to report that a method or other routine has stalled. For example, a list can be kept of each instance of a stalled method, a report can be generated/displayed/reported when a method stalls, the system can keep track of the number of times a method stalls, the system can keep track of the percentage of methods that are stalled, the system can keep track of the number of instances of a method that are currently stalled, etc. A stalled method (or other routine) can be used to trigger an event such as an email, page, dialog box, printed report, the starting of a diagnostic program, etc. Many different types of reporting mechanisms can be used with the current invention. No one reporting mechanism is more suited for the current invention because the reporting mechanism used is likely dictated by the needs of the user.

One example of a reporting mechanism is a counter. In one embodiment, there is one counter for each method being monitored. The counter will store the number of instances of that method that are currently stalled. The counter will also include a log, which will keep a record of the time when the counter is incremented or decremented, the operation performed (increment or decrement), and an identification of the instance that caused the operation. From the log information, the system can determine the total number of stalls of instances of the method, the number of stalled instances of the method at a given time, the number of stalled instances of the method during a customizable time period, the identity of all instances that stalled, and many other useful data values. In the embodiment that uses the counter, step 276 of FIG. 5 would decrement the counter because one of the methods thought to be stalled is no longer determined to be stalled. Step 350 of FIG. 7 would increment the counter because another method was determined to be stalled.

Figure 8:
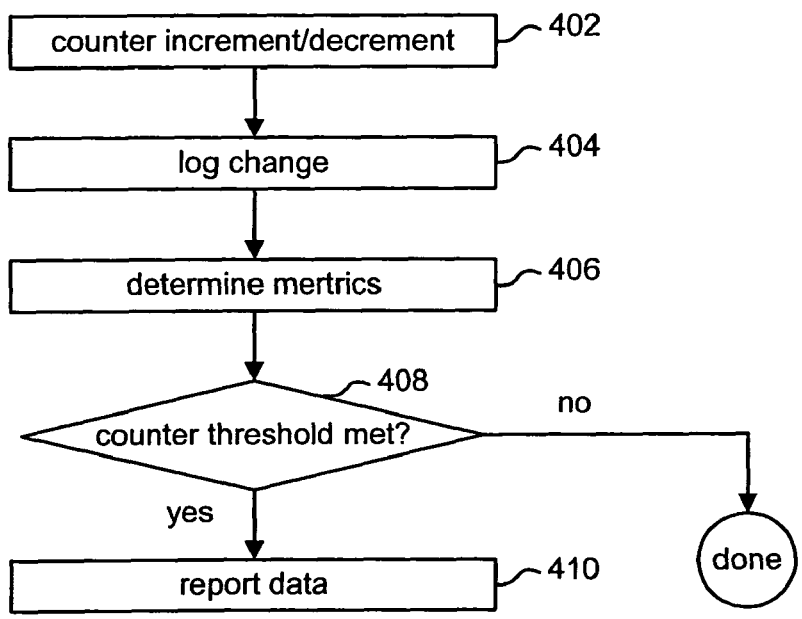
FIG. 8 is a flow chart describing one embodiment of a process for reporting.

FIG. 8 describes one embodiment of how the system can report a stalled routine using the counter described above. A counter object can be created that implements the functionality described above. In one embodiment, there is one counter object for each method being monitored and the value of the counter reflects the number of instances of the method that are currently stalled. In addition, a threshold can be set up for the counter object. If the counter reaches that threshold, the counter reports to a user, client, etc. The steps of FIG. 8 are those that are performed by the counter object. In step 402, the counter object receives a request to increment or decrement the counter and, in response, the counter is updated accordingly. In some embodiments, the instance of the method being monitored and the current time is also provided. Alternatively, the counter object can acquire the current time from the operating system. In step 404, the counter logs the change by noting the time and the identification of the instance of the method. In step 406, any requested metric can be determined. That is, a user can request that the counter object keep track of the total number of stalls, the number of stalled routines at a given time, or other useful data values (described above or otherwise). The user can also set a threshold for any of the metrics. These requested values are calculated in step 406. In step 408, it is determined whether any of the thresholds for the calculated or stored data values are met. If so, the data associated with the metric that met its threshold is reported, or all data (or another subset of the data) is reported in step 410. Step 410 can include sending an email, sending a page, displaying a dialog box, playing a sound, printing a document, writing to a file, writing to report/log, reporting to a routine, displaying the data graphically or any other suitable means for communicating the information to a user in a meaningful manner.

Figure 9:
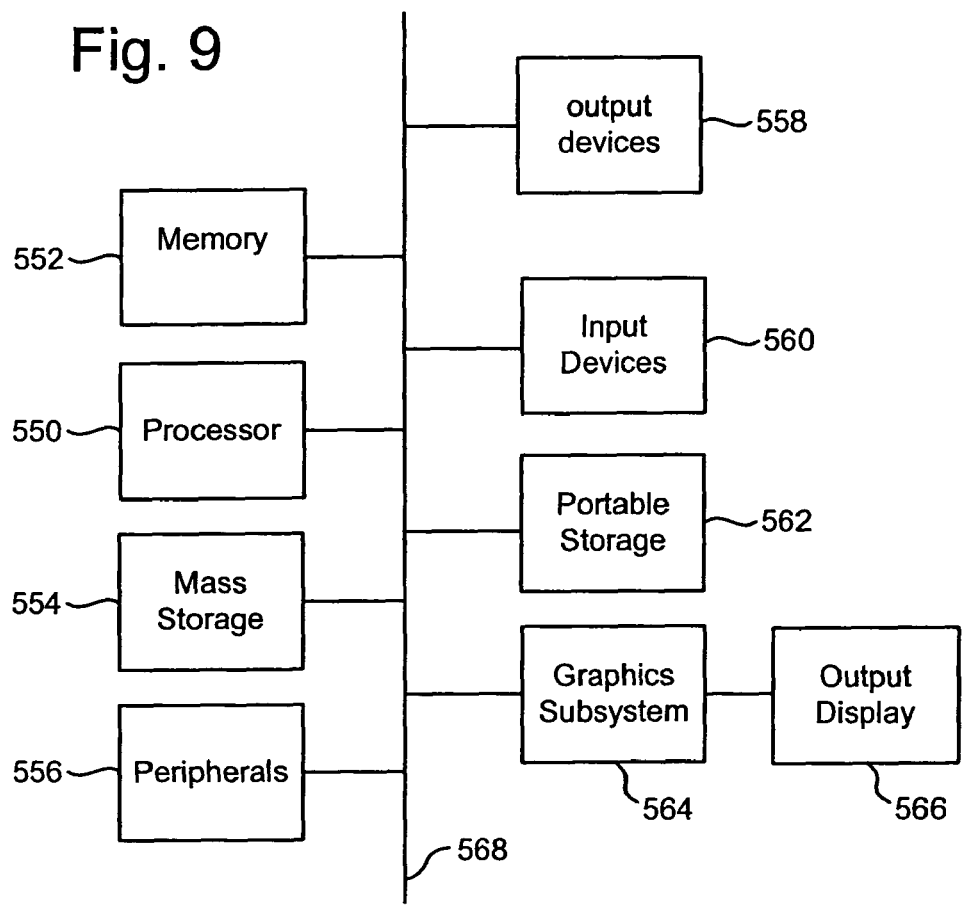
FIG. 9 is a block diagram of one embodiment of a computing system that can be used to implement the present invention.

FIG. 9 illustrates a high level block diagram of a computer system which can be used for various components of the present invention. The computer system of FIG. 9 includes one or more processors 550 and main memory 552. Main memory 552 stores, in part, instructions and data for execution by processor unit 550. If the system of the present invention is wholly or partially implemented in software, main memory 552 can store the executable code when in operation. The system of FIG. 9 further includes a mass storage device 554, peripheral device(s) 556, user input device(s) 560, output devices 558, portable storage medium drive(s) 562, a graphics subsystem 564 and an output display 566. For purposes of simplicity, the components shown in FIG. 9 are depicted as being connected via a single bus 568. However, the components may be connected through one or more data transport means. For example, processor unit 550 and main memory 552 may be connected via a local microprocessor bus, and the mass storage device 554, peripheral device(s) 556, portable storage medium drive(s) 562, and graphics subsystem 64 may be connected via one or more input/output (I/O) buses. Mass storage device 554, which may be implemented with a magnetic disk drive or an optical disk drive, is a non-volatile storage device for storing data and instructions for use by processor unit 550. In one embodiment, mass storage device 554 stores the system software for implementing the present invention for purposes of loading to main memory 552.

Portable storage medium drive 562 operates in conjunction with a portable non-volatile storage medium, such as a floppy disk, to input and output data and code to and from the computer system of FIG. 9. In one embodiment, the system software for implementing the present invention is stored on such a portable medium, and is input to the computer system via the portable storage medium drive 562. Peripheral device(s) 556 may include any type of computer support device, such as an input/output (I/O) interface, to add additional functionality to the computer system. For example, peripheral device(s) 556 may include a network interface for connecting the computer system to a network, a modem, a router, etc.

User input device(s) 560 provides a portion of a user interface. User input device(s) 560 may include an alpha-numeric keypad for inputting alpha-numeric and other information, or a pointing device, such as a mouse, a trackball, stylus, or cursor direction keys. In order to display textual and graphical information, the computer system of FIG. 9 includes graphics subsystem 564 and output display 566. Output display 566 may include a cathode ray tube (CRT) display, liquid crystal display (LCD) or other suitable display device. Graphics subsystem 564 receives textual and graphical information, and processes the information for output to display 566. Additionally, the system of FIG. 9 includes output devices 558. Examples of suitable output devices include speakers, printers, network interfaces, monitors, etc.

The components contained in the computer system of FIG. 9 are those typically found in computer systems suitable for use with the present invention, and are intended to represent a broad category of such computer components that are well known in the art. Thus, the computer system of FIG. 9 can be a personal computer, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for detecting whether a routine has stalled, comprising:
   receiving a call from within a particular routine indicating that said particular routine has started, said particular routine is one of a plurality of routines that comprise a process;
   receiving a call from within said particular routine indicating that said particular routine has completed, if said particular routine has completed;
   automatically determining that said particular routine has stalled if said call indicating that said particular routine has completed is not provided prior to being overdue, such that being overdue is based on said call indicating that a particular routine has started; and
   reporting that said particular routine has stalled, if said particular routine has stalled.

2. A method according to claim 1, wherein:
   said particular routine is a thread;
   said plurality of routines are threads; and
   at least two or more of said threads, including said particular routine, are run concurrently.

3. A method according to claim 1, wherein:
   said particular routine is a method.

4. A method according to claim 3, wherein:
   said automatically determining includes detecting whether a thread enters said method and does not return within an approximation of an expected time frame.

5. A method according to claim 1, further comprising:
   modifying existing object code for said particular routine to add said call indicating that said particular routine has started, said call is a call to a start method.

6. A method for detecting whether a method has stalled, comprising:
   receiving an indication that a particular method of an object is running; and
   automatically determining whether said particular method has stalled by detecting whether a thread entered said particular method and did not return within an approximation of an expected time frame.

7. One or more processor readable storage devices having processor readable code embodied on said processor readable storage devices, said processor readable code for programming one or more processors to perform a method comprising:
   receiving a call from within a first routine indicating that said first routine has started;
   starting a timing mechanism in response to said call indicating that said first routine has started;
   receiving a call from within said first routine indicating that said first routine has completed, if said first routine has completed;
   stopping said timing mechanism in response to receiving said call indicating that said first routine has completed; and
   reporting said first routine as stalled if said timing mechanism is not stopped prior to a determination that said timing mechanism is overdue.

8. One or more processor readable storage devices according to claim 7, wherein said method further comprises:
   accessing a current time;
   verifying that said first routine is not known to be stalled or completed;
   accessing a due time for said first routine; and
   determining whether said due time is earlier than said current time, said timing mechanism is overdue if said step of determining concludes that said first due time is earlier than said current time.

9. One or more processor readable storage devices according to claim 7, wherein said step of stopping said timing mechanism comprises the steps of:
  determining whether said first routine has been reported as being stalled;
  changing said reporting to no longer indicate that said first routine is stalled if said first routine has been reported as being stalled; and
  stopping said timing mechanism if said first routine has not been reported as being stalled.

10. One or more processor readable storage devices according to claim 7, wherein said method further comprises:
  modifying existing object for said first routine to create said timing mechanism.

11. One or more processor readable storage devices having processor readable code embodied on said processor readable storage devices, said processor readable code for programming one or more processors to perform a method comprising:
  receiving a call from within a particular routine indicating that said particular routine has started;
  receiving a call from within said particular routine indicating that said particular routine has completed, if said particular routine has completed; and
  reporting said particular routine as stalled if said call indicating that said particular routine has completed is not received prior to being overdue in relation to said call indicating that said particular routine has started.

12. One or more processor readable storage devices according to claim 11, wherein:
  said steps of receiving a call indicating that a particular routine has started and receiving a call indicating that a particular routine has completed include detecting whether a thread enters a method and does not return within an approximation of an expected time frame.

13. One or more processor readable storage devices according to claim 11, wherein:
  said particular routine is a thread.

14. One or more processor readable storage devices according to claim 11, wherein:
  said particular routine is a method.

15. A method for detecting whether a routine has stalled, comprising:
  receiving a first call from within a particular routine indicating that said particular routine has started;
  receiving a second call from within said particular routine indicating that said particular routine has completed;
  automatically determining whether said particular routine is stalled based on said first call and said second call; and
  reporting said particular routine as being stalled if said particular routine is determined to be stalled.

16. A method according to claim 15, wherein:
  said particular routine is a thread of a plurality of threads that comprise a process; and
  at least two or more of said threads, including said particular routine, are run concurrently.

17. A method according to claim 15, wherein:
  said particular routine is a method.

18. A method according to claim 15, wherein:
  said automatically determining includes detecting whether a thread enters a method and does not return within an approximation of an expected time frame.

19. A method according to claim 15, wherein:
  said automatically determining includes calculating a due time based on said first call and determining whether said particular routine is still running after said due time.

20. One or more processor readable storage devices having processor readable code embodied on said processor readable storage devices, said processor readable code for programming one or more processors to perform a method comprising:
  receiving a first call from within a particular routine indicating that said particular routine has started, said particular routine is one of a plurality of routines that comprise a process;
  receiving a second call from within said particular routine indicating that said particular routine has completed;
  automatically determining whether said particular routine is stalled based on said first call and said second call; and
  reporting said particular routine as being stalled if said particular routine is determined to be stalled.

21. One or more processor readable storage devices according to claim 20, wherein:
  said particular routine is a thread; and
  said process includes a plurality of additional threads.

22. One or more processor readable storage devices according to claim 20, wherein:
  said particular routine is a method.

23. One or more processor readable storage devices according to claim 20, wherein:
  said automatically determining includes detecting whether a thread enters a method and does not return within an approximation of an expected time frame.

* * * * *